(12) United States Patent
Lee

(10) Patent No.: US 10,936,485 B2
(45) Date of Patent: Mar. 2, 2021

(54) DATA STORAGE DEVICE FOR DYNAMIC GARBAGE COLLECTION TRIGGERING AND OPERATING METHOD THEREOF

(71) Applicant: SK hynix Inc., Gyeonggi-do (KR)

(72) Inventor: Dong Yong Lee, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 0 days.

(21) Appl. No.: 16/526,543

(22) Filed: Jul. 30, 2019

(65) Prior Publication Data

US 2020/0192794 A1    Jun. 18, 2020

(30) Foreign Application Priority Data

Dec. 13, 2018  (KR) .................. 10-2018-0161253

(51) Int. Cl.
*G06F 12/02*      (2006.01)
*G06F 3/06*       (2006.01)

(52) U.S. Cl.
CPC .......... *G06F 12/0276* (2013.01); *G06F 3/064* (2013.01); *G06F 3/0607* (2013.01); *G06F 3/0653* (2013.01); *G06F 3/0679* (2013.01)

(58) Field of Classification Search
CPC ............ G06F 12/0276; G06F 12/0253; G06F 12/0261; G06F 12/0269; G06F 2212/703; G06F 2212/7205; G06F 3/0607; G06F 3/064; G06F 3/0653; G06F 3/0679
See application file for complete search history.

(56) References Cited

U.S. PATENT DOCUMENTS

| | | | |
|---|---|---|---|
| 8,626,986 B2 | 1/2014 | Wu et al. | |
| 8,949,555 B1* | 2/2015 | Karamcheti | G06F 3/0655 711/158 |
| 2009/0125671 A1* | 5/2009 | Flynn | G06F 11/1008 711/103 |
| 2011/0107050 A1* | 5/2011 | Vengerov | G06F 12/0269 711/170 |
| 2014/0032817 A1* | 1/2014 | Bux | G06F 12/0261 711/103 |
| 2016/0342458 A1* | 11/2016 | Cai | G11C 16/349 |
| 2019/0035445 A1* | 1/2019 | Huang | G06F 12/0246 |

FOREIGN PATENT DOCUMENTS

| | | |
|---|---|---|
| KR | 1020170099018 | 8/2017 |
| KR | 1020180009430 | 1/2018 |

* cited by examiner

*Primary Examiner* — Tracy A Warren
(74) *Attorney, Agent, or Firm* — IP & T Group LLP

(57) ABSTRACT

A data storage device includes a controller including a flash translation layer (FTL) for controlling an operation of a nonvolatile memory device. The FTL may monitor a first read operation on the plurality of data storage regions, collect first read operation information of a first subset of data storage regions on which the first read operation is performed, the first read operation information including read counts of the first subset of data storage regions on which the first read operation is performed, and information of the first subset of data storage regions on whether soft decision has been performed on the data storage regions, change a garbage collection (GC) threshold value based on the collected first read operation information, and control the nonvolatile memory device to perform GC on the plurality of data storage regions based on the changed GC threshold value.

20 Claims, 8 Drawing Sheets

DATA STORAGE DEVICE FOR DYNAMIC GARBAGE COLLECTION TRIGGERING AND OPERATING METHOD THEREOF

CROSS-REFERENCES TO RELATED APPLICATION

The present application claims priority under 35 U.S.C. § 119(a) to Korean application number 10-2018-0161253, filed on Dec. 13, 2018, which is incorporated herein by reference in its entirety.

BACKGROUND

1. Technical Field

Various embodiments generally relate to a semiconductor device, and more particularly, to a data storage device and an operating method thereof.

2. Related Art

Recently, the paradigm for the computing environment has changed to the ubiquitous computing environment in which computer systems can be used anytime, anywhere. Therefore, the use of portable electronic devices such as a mobile phone, digital camera and notebook computer has rapidly increased. Such portable electronic devices generally use a data storage device using a memory device. The data storage device is used to store data used in the portable electronic device.

Since the data storage device using a memory device has no mechanical driver, the data storage device has excellent stability and durability, exhibits high information access speed, and has low power consumption. Examples of the data storage device having such advantages include a universal serial bus (USB) memory device, a memory card having various interfaces, a universal flash storage (UFS) device, and a solid state drive (SSD).

SUMMARY

Various embodiments are directed to a for data storage device which is capable of efficiently operating garbage collection of a data storage device.

In an embodiment, a data storage device may include: a nonvolatile memory device including a plurality of data storage regions; and a controller including a flash translation layer (FTL) for controlling an operation of the nonvolatile memory device. The FTL may monitor a first read operation on the plurality of data storage regions, collect first read operation information of a first subset of data storage regions on which the first read operation is performed, among the plurality of data storage regions, the first read operation information including read counts of the first subset of data storage regions and information of the first subset of data storage regions on whether soft decision has been performed, change a garbage collection (GC) threshold value based on the collected first read operation information, and control the nonvolatile memory device to perform GC on the plurality of data storage regions based on the changed GC threshold value.

In an embodiment, there is provided an operating method of a data storage device which includes a nonvolatile memory device including a plurality of data storage regions and a controller configured to control an operation of the nonvolatile memory device. The operating method may include monitoring, by the controller, a first read operation on the plurality of data storage regions; collecting, by the controller, first read operation information from the monitoring result of the first read operation, the first read operation information including read counts of a first subset of data storage regions on which the first read operation is performed, among the plurality of data storage regions, and information of the first subset of data storage regions on whether soft decision has been performed; changing, by the controller, a GC threshold value based on the collected first read operation information; and controlling, by the controller, the nonvolatile memory device to perform GC on the plurality of data storage regions based on the changed GC threshold value.

DETAILED DESCRIPTION

Hereinafter, a data storage device and an operating method thereof according to the present disclosure will be described below with reference to the accompanying drawings through exemplary embodiments.

Figure 1:
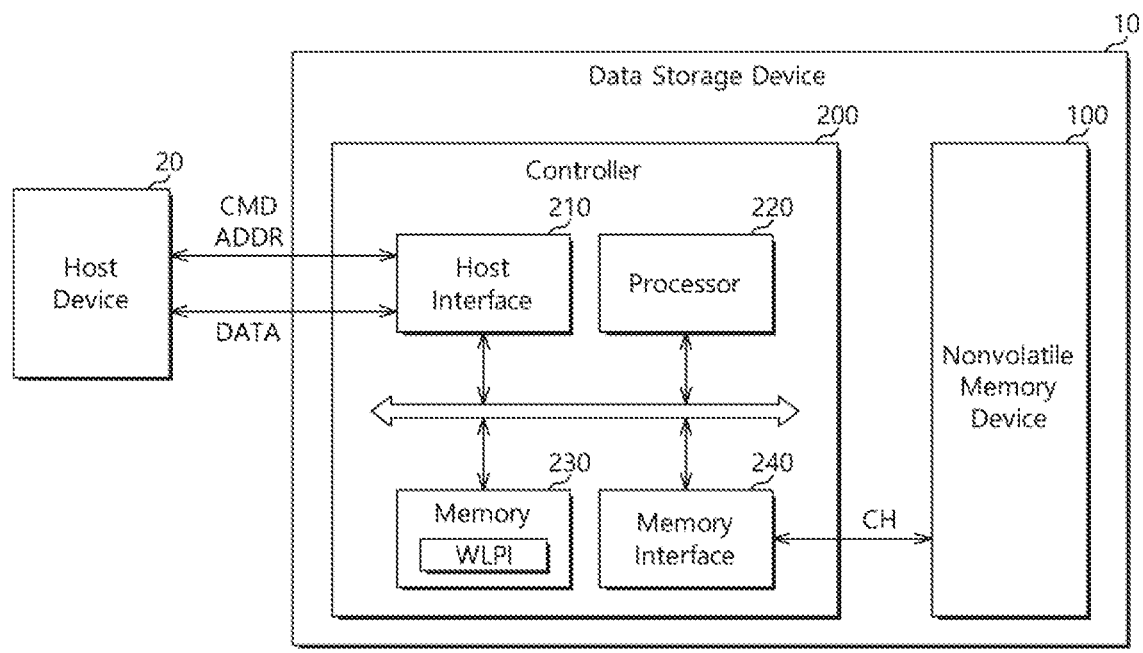
FIG. 1 is a diagram illustrating a data storage device in accordance with an embodiment.

FIG. 1 is a diagram illustrating a data storage device 10 in accordance with an embodiment.

Referring to FIG. 1, the data storage device 10 may store data accessed by a host device 20 such as a mobile phone, MP3 player, laptop computer, desktop computer, game machine, television (TV) or in-vehicle infotainment system. The data storage device 10 may be referred to as a memory system.

The data storage device 10 may be fabricated as any one of various types of storage devices depending on an interface protocol coupled to the host device 20. For example, the data storage device may be configured as any one of various types of storage devices which include a solid state drive (SSD), a multimedia card (MMC) such as an eMMC, RS-MMC or micro-MMC, a secure digital (SD) card such as a mini-SD or micro-SD card, a universal serial bus (USB)

storage device, a universal flash storage (UFS) device, a personal computer memory card international association (PCMCIA) card-type storage device, a peripheral component interconnection (PCI) card-type storage device, a PCI express (PCI-e or PCIe) card-type storage device, a compact flash (CF) card, a smart media card and a memory stick.

The data storage device 10 may be fabricated as any one of various types of packages. For example, the data storage device 10 may be fabricated as any one of various types of packages such as a package-on-package (POP), a system-in-package (SIP), a system-on-chip (SOC), a multi-chip package (MCP), a chip-on-board (COB), a wafer-level fabricated package (WFP) and a wafer-level stack package (WSP).

The data storage device 10 may include a nonvolatile memory device 100 and a controller 200.

The nonvolatile memory device 100 may operate as a storage medium of the data storage device 10. The nonvolatile memory device 100 may be configured as any one of various types of nonvolatile memory devices including a NAND flash memory device, a NOR flash memory device, a ferroelectric random access memory (FRAM) using a ferroelectric capacitor, a magnetic RAM (MRAM) using a tunneling magneto-resistive (TMR) film, a phase change RAM (PRAM) using chalcogenide alloys, and a resistive RAM (ReRAM) using transition metal oxide, depending on memory cells.

Although FIG. 1 illustrates that the data storage device 10 includes one nonvolatile memory device 100, the data storage device may include a plurality of nonvolatile memory devices. The present embodiment may be applied in the same manner to the data storage device 10 including a plurality of nonvolatile memory devices.

The nonvolatile memory device 100 may include a memory cell array (not illustrated) having a plurality of memory cells arranged at the respective intersections between a plurality of bit lines (not illustrated) and a plurality of word lines (not illustrated). The memory cell array may include a plurality of memory blocks, and each of the memory blocks may include a plurality of pages.

For example, each of the memory cells of the memory cell array may be configured as a single level cell (SLC) capable of storing 1-bit data or a multi-level cell (MLC) capable of storing 2 or more-bit data. The MLC may store 2-bit data, 3-bit data, 4-bit data or the like. In general, a memory cell for storing 2-bit data may be referred to as an MLC, a memory cell for storing 3-bit data may be referred to as a triple level cell (TLC), and a memory cell for storing 4-bit data may be referred to as a quadruple level cell (QLC). However, for the purpose of convenience, the memory cells for storing 2-bit to 4-bit data will be collectively referred to as MLCs, for convenience of description.

In various embodiments, a page for storing data (i.e., data page) may include K memory cells each capable of storing N bits therein, where K and N are integers greater than or equal to 2. Therefore, the data page may include sub data pages as N virtual data pages, according to N bits which can be stored in each of the memory cells. For example, an MLC capable of storing two bits therein may include a least significant bit (LSB) page and a most significant bit (MSB) page as two sub data pages. For another example, a TLC capable of storing three bits therein may include an LSB page, a center significant bit (CSB) page and an MSB page as three sub data pages.

Figure 12:
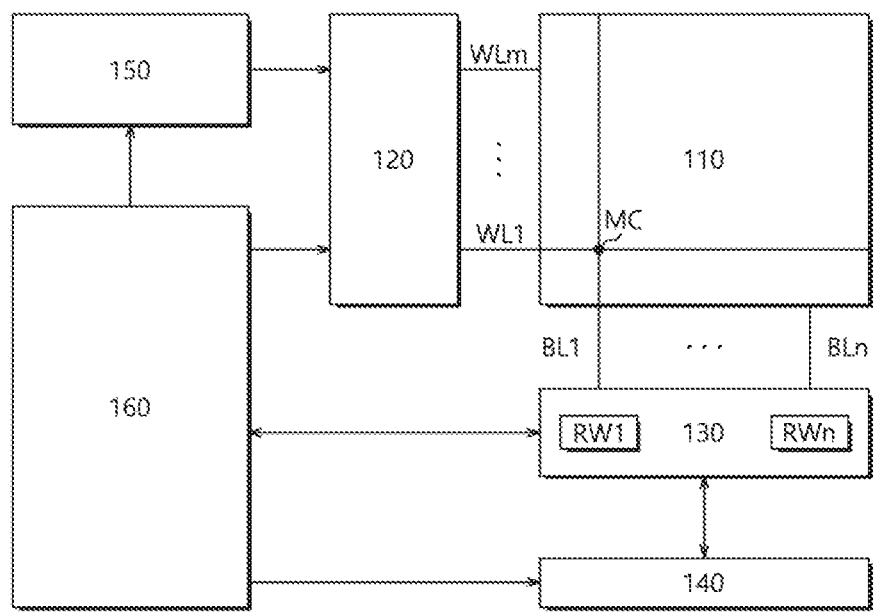
FIG. 12 is a block diagram illustrating a nonvolatile memory device included in a data storage device in accordance with an embodiment.

The memory cell array as shown in 110 of FIG. 12 may include one or more of the SLC and the MLC. Furthermore, the memory cell array may include memory cells with a two-dimensional structure or memory cells with a three-dimensional structure.

The controller 200 may control overall operations of the data storage device 10 by driving firmware or software loaded to the memory 230. The controller 200 may decode and drive a code-based instruction or algorithm such as firmware or software. The controller 200 may be implemented in hardware or a combination of hardware and software.

The controller 200 may include a host interface 210, a processor 220, a memory 230 and a memory interface 240. Although not illustrated in FIG. 1, the controller 200 may further include an error correction code (ECC) engine which generates parity data by performing ECC encoding on write data provided from the host device 20, and performs ECC decoding on read data read from the nonvolatile memory device 100 using the parity data. The ECC engine may perform hard decision and soft decision for the read data read from the nonvolatile memory device 100. The hard decision may indicate a method for correcting errors of read data read from the nonvolatile memory device 100, by using only error correction codes and data which are read (referred to as hard decision data) according the on/off characteristic of a memory cell when a predetermined reference read voltage is applied. The soft decision may indicate a method for correcting errors of read data read from the nonvolatile memory device 100, by additionally using additional information on the reliability of hard decision data as well as the hard decision data and the error correction codes. Hereafter, the additional information will be referred to as reliability data. The ECC engine may perform both or any one of the hard decision and the soft decision on data received from the nonvolatile memory device 100 and the memory 230. When errors of the read data read from the nonvolatile memory device 100 are not corrected through the hard decision, the ECC engine may perform the soft decision by using the additional information in the memory 230 or the nonvolatile memory device 100.

The host interface 210 may interface the host device 20 and the data storage device 10 according to a protocol. For example, the host interface 210 may communicate with the host device 20 through any one protocol of universal serial bus (USB), universal flash storage (UFS), multimedia card (MMC), parallel advanced technology attachment (PATA), serial advanced technology attachment (SATA), small computer system interface (SCSI), serial attached SCSI (SAS), peripheral component interconnection (PCI) and PCI express (PCI-e or PCIe).

The processor 220 may include a micro control unit (MCU) and/or a central processing unit (CPU). The processor 220 may process a request received from the host device 20. In order to process the request received from the host device 20, the processor 220 may drive a code-based instruction or algorithm loaded to the memory 230, i.e. firmware, and control the nonvolatile memory device 100 and internal function blocks such as the host interface 210, the memory 230 and the memory interface 240.

The processor 220 may generate control signals to control an operation of the nonvolatile memory device 100 based on requests received from the host device 20. Further, the processor 220 may provide the generated control signals to the nonvolatile memory device 100 through the memory interface 240.

The memory 230 may be configured as a random access memory (RAM) such as a dynamic RAM (DRAM) or static RAM (SRAM). The memory 230 may store the firmware driven by the processor 220. Furthermore, the memory 230 may store data required for driving the firmware, for example, metadata. That is, the memory 230 may operate as a working memory of the processor 220.

The memory 230 may include a data buffer for temporarily storing write data which are to be transferred from the host device 20 to the nonvolatile memory device 100 or read data which are to be transferred from the nonvolatile memory device 100 to the host device 20. That is, the memory 230 may operate as a buffer memory.

The memory interface 240 may control the nonvolatile memory device 100 under control of the processor 220. The memory interface 240 may also be referred to as a memory controller. The memory interface 240 may provide control signals to the nonvolatile memory device 100. The control signals may include a command, address, and operation control signal for controlling the nonvolatile memory device 100. The memory interface 240 may provide data stored in the data buffer of the memory 230 to the nonvolatile memory device 100 or store data received from the nonvolatile memory device 100 in the data buffer.

Figure 2:
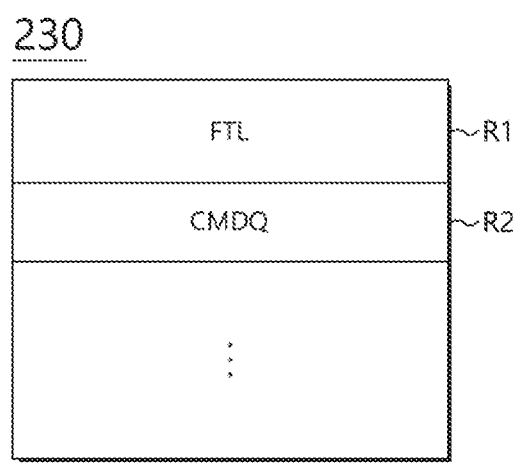
FIG. 2 is a diagram illustrating a memory of FIG. 1.

FIG. 2 is a diagram illustrating the memory 230 of FIG. 1.

Referring to FIG. 2, the memory 230 may include a first region R1 and a second region R2. The first region R1 may store a flash translation layer (FTL). The second region R2 may be used as a command queue CMDQ for queuing a command corresponding to a request received from the host device 20. Although FIG. 2 illustrates the memory 230 including two regions, in addition to the two regions, the memory 230 may include regions for various uses, such as a region used as a write data buffer for temporarily storing write data, a region used as a read data buffer for temporarily storing read data, and a region used as a map cache buffer for caching map data.

Referring back to FIG. 1, the memory 230 may include a region for storing system data or metadata. The region may store workload pattern information (WLPI).

When the nonvolatile memory device 100 is implemented by using a flash memory device, the processor 220 may control a unique operation of the nonvolatile memory device 100, and drive software referred to as the FTL in order to provide device compatibility to the host device 20. As the FTL is driven, the host device 20 may recognize and use the data storage device 10 as a general storage device such as a hard disk.

The FTL may be stored in the first region R1 of the memory 230. The FTL may include modules for performing various functions and metadata required for driving the respective modules. The FTL may be stored in a system region (not illustrated) of the nonvolatile memory device 100. When the data storage device 10 is powered on, the FTL may be read from the system region of the nonvolatile memory device 100, and loaded to the first region R1 of the memory 230.

Figure 3:
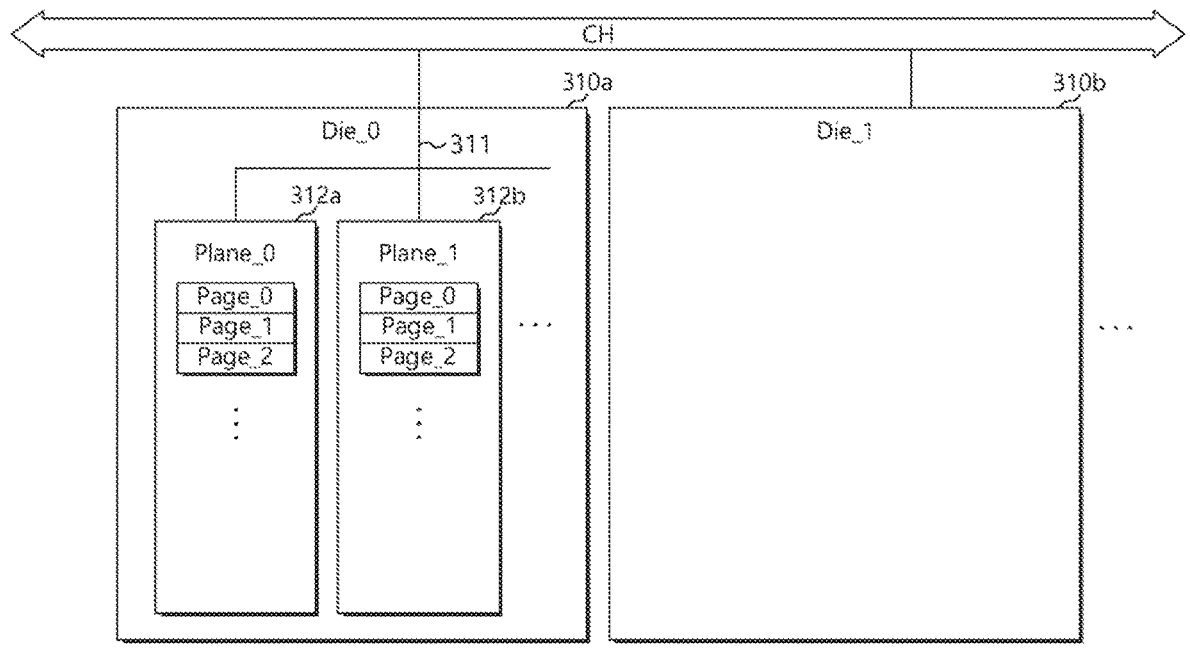
FIG. 3 is a diagram illustrating a data storage region included in a nonvolatile memory device in accordance with an embodiment.

FIG. 3 is a diagram illustrating a data storage region in a nonvolatile memory device (e.g., the nonvolatile memory device 100 of FIG. 1) in accordance with an embodiment.

Referring to FIG. 3, the nonvolatile memory device 100 may include a plurality of dies 310a and 310b which share a channel CH coupled to the controller 200. Each of the dies 310a and 310b may include a plurality of planes 312a and 312b which share a way 311 coupled to the channel CH. Each of the planes 312a and 312b may include a plurality of data pages. Each of the data pages may indicate the minimum unit of storage region from or to which data is read or written. A plurality of data pages which are collectively erased may be referred to as a block. A plurality of blocks which are managed as one block may be referred to as a super block. The data storage region of the nonvolatile memory device 100 may be implemented with a die, a plane, a super block, a memory block, or a data page. By way of example, in the following descriptions, the data storage region may be implemented with a page unless otherwise referred.

Figure 4:
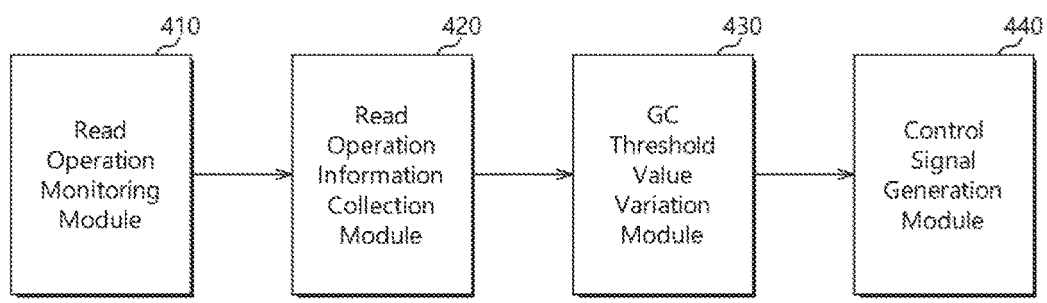
FIG. 4 is a block diagram illustrating a flash translation layer (FTL) in accordance with an embodiment.

FIG. 4 is a block diagram illustrating a flash translation layer (FTL) 400 in accordance with an embodiment.

Referring to FIG. 4, the FTL 400 may include a read operation monitoring module 410, a read operation information collection module 420, a garbage collection (GC) threshold value variation module 430 and a control signal generation module 440. The FTL 400 may vary a GC threshold value, i.e., GC triggering condition for deciding whether to perform GC. When performing GC on data storage regions, the data storage device 10 may perform GC on data storage regions whose read counts exceed the GC threshold value. The read operation monitoring module 410 may monitor a read operation on a data storage region of a memory device (e.g., the nonvolatile memory device 100 of FIG. 1). Specifically, when a read operation is performed on a data storage region in the nonvolatile memory device 100 according to a read request of the host device 20, the read operation monitoring module 410 may monitor the read count of the data storage region where the read operation has been performed. Further, the read operation monitoring module 410 may monitor whether soft decision has been performed on data of the data storage region.

The read operation monitoring module 410 may monitor a first read operation for decreasing a GC threshold value. Specifically, in order to decrease a first threshold value, i.e., default GC triggering condition to a second threshold value less than the first threshold value, the read operation monitoring module 410 may monitor read operations for a first set time, or monitor read operations on a first set number of data storage regions. The first threshold value may be set in a fabrication step or use step of the data storage device 10 or varied in accordance with the present embodiment.

In an embodiment, the first set time may indicate the time during which a sufficient read operation can be performed to set the second threshold value. The first set time may be set based on seconds, minutes, hours or days at the fabrication step or use step of the data storage device 10.

In an embodiment, the first set number may indicate the number of data storage regions enough to set the second threshold value. The first set number may be set to a percentage or ratio with respect to the entire data storage regions in the nonvolatile memory device 100. The first set number may be set in the fabrication step or use step of the data storage device 10. For example, the first set number may indicate 80% or more of the entire data storage regions in the data storage device 10.

The read operation monitoring module 410 may monitor a second read operation for increasing a GC threshold value. Specifically, when the GC threshold value is varied to the second threshold value less than the first threshold value, the read operation monitoring module 410 may monitor a read operation for a second set time or monitor a read operation on a second set number of data storage regions, in order to increase the GC threshold value to a third threshold value greater than the second threshold value.

In an embodiment, the second set time may indicate the time during which a sufficient read operation can be performed to set the third threshold value. The second set time may be set based on seconds, minutes, hours or days at the fabrication step or use step of the data storage device 10.

In an embodiment, the second set number may indicate the number of data storage regions enough to set the third threshold value. The second set number may be set to a percentage or ratio with respect to the entire data storage regions in the nonvolatile memory device 100. The second set number may be set in the fabrication step or use step of the data storage device 10. For example, the second set number may indicate 80% or more of the entire data storage regions in the data storage device 10.

The read operation information collection module 420 may collect read operation information including a read count and information whether soft decision has been performed. Specifically, when a read operation is performed on a data storage region in the nonvolatile memory device 100, the read operation information collection module 420 may collect read operation information from the read operation monitoring result. In various embodiments, the read operation information may include the read count of the data storage region where the read operation is performed and information on whether soft decision has been performed on data of the data storage region.

The read operation information collection module 420 may collect first read operation information. Specifically, when the first threshold value is to be changed to the second threshold value less than the first threshold value, the read operation information collection module 420 may collect the first read operation information from the monitoring result of the first read operation. In various embodiments, the first read operation information may include read operation information on the data storage device 10 where the first read operation was performed.

In an embodiment, the read operation information collection module 420 may collect the first read operation information including the read count of a data storage region on which soft decision has been performed, among the data storage regions on which the first read operation was performed.

The read operation information collection module 420 may collect second read operation information. Specifically, when the second threshold value is to be changed or adjusted to the third threshold value greater than the second threshold value, the read operation information collection module 420 may collect the second read operation information from the monitoring result of the second read operation. In various embodiments, the second read operation information may include read operation information on the data storage device 10 where the second read operation was performed.

In an embodiment, the read operation information collection module 420 may collect the second read operation information on a data storage region of which the read count exceeds the second threshold value and on which soft decision is not performed, among the data storage regions on which the second read operation was performed.

The GC threshold value variation module 430 may vary or adjust a threshold value for deciding whether to perform GC based on the read operation information.

When the average value of the read counts in the first read operation information is less than the first threshold value, the GC threshold value variation module 430 may vary or change the GC threshold value to the second threshold value which is the average value of the read counts included in the first read operation information.

In an embodiment, the read counts in the first read operation information may indicate the read counts of data storage regions on which soft decision has been performed, among the data storage regions on which the first read operation was performed.

When the average value of the read counts in the second read operation information is greater than the second threshold value, the GC threshold value variation module 430 may vary or adjust the GC threshold value to the third threshold value which is the average value of the read counts in the second read operation information.

In an embodiment, the read counts in the second read operation information may indicate the read counts of data storage regions which have a read count greater than the second threshold value and on which soft decision is not performed, among the data storage regions on which the second read operation was performed.

In an embodiment, when the second threshold value is less than a preset ratio M of the first threshold value, the GC threshold value variation module 430 may increase the GC threshold value. For example, when the second threshold value is less than 80% of the first threshold value, the GC threshold value variation module 430 may vary or change the second threshold value to the third threshold value.

The control signal generation module 440 may generate a control signal for controlling the nonvolatile memory device 100. Specifically, the control signal generation module 440 may generate a control signal for controlling the nonvolatile memory device 100 to perform GC according to the varied GC threshold value. At this time, the nonvolatile memory device 100 may perform GC according to the varied threshold value.

Although FIG. 4 illustrates the function of the firmware for varying a threshold value among the functions of the FTL, the FTL may also be implemented by using separate hardware such as a circuit.

Figure 5:
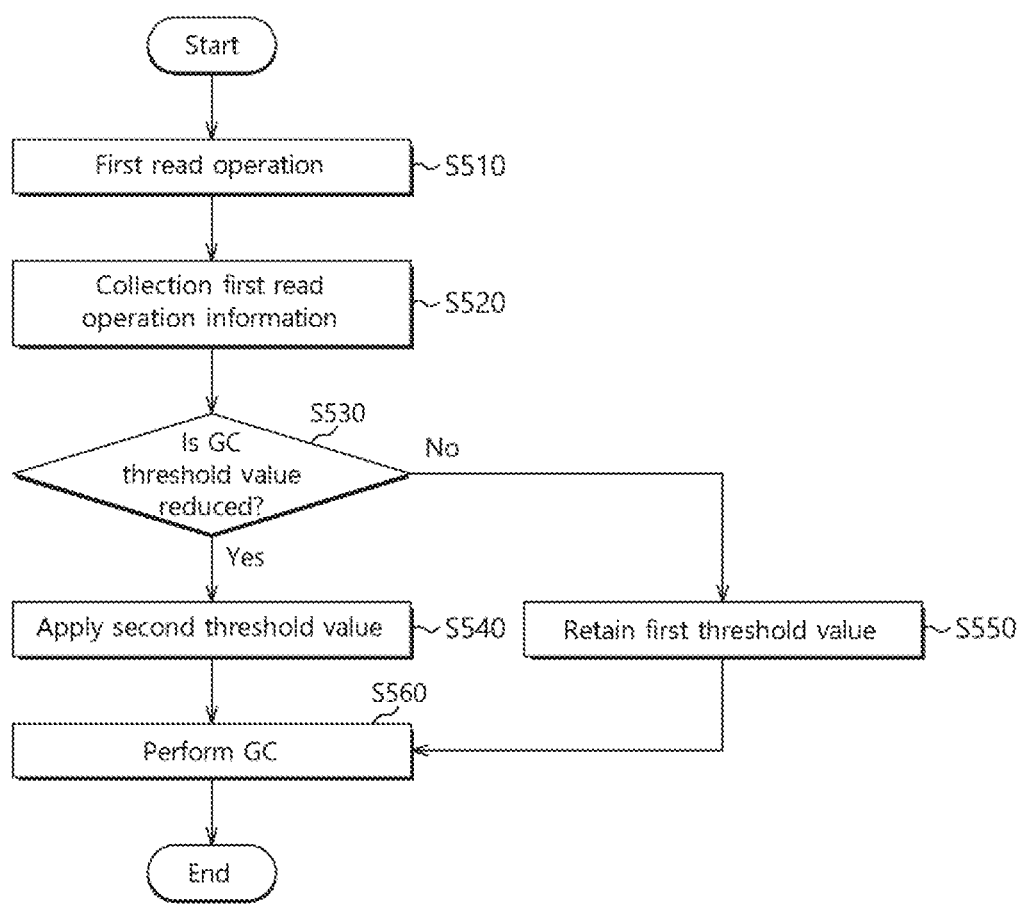
FIG. 5 is a flowchart illustrating an operating method of a data storage device in accordance with an embodiment.

FIG. 5 is a flowchart illustrating an operating method of a data storage device in accordance with an embodiment, for example, the data storage device 10 of FIG. 1.

Referring to FIG. 5, at step S510, a first read operation may be performed. Specifically, when a read request is received from the host device 20, the controller 200 may control the nonvolatile memory device 100 to perform a read operation according to the read request. The nonvolatile memory device 100 may perform the first read operation on data storage regions corresponding to the read request, under control of the controller 200. At this time, the controller 200 may monitor the read counts of the data storage regions on which the first read operation is performed and whether soft decision has been performed on data of the data storage regions.

At step S520, first read operation information may be collected. Specifically, the controller 200 may collect first read operation information from the monitoring result of the first read operation. In various embodiments, the first read operation information may include the read counts of the data storage regions on which the first read operation was performed and information of the data storage regions on whether soft decision has been performed.

In an embodiment, the first read operation information may include the read counts of the data storage regions on which soft decision has been performed, among the data storage regions on which the first read operation was performed.

At step S530, the controller 200 may determine whether a threshold value should be reduced or decreased. Specifically, when the average value of the read counts in the first read operation information is less than the first threshold value, the controller 200 may determine that the first threshold value should be changed or adjusted to the second threshold value which is the average value of the read counts in the first read operation information. When the average value of the read counts in the first read operation information is greater than or equal to the first threshold value, the controller 200 may determine that the first threshold value should be retained.

When it is determined that a threshold value should be reduced (S530, Yes), at step S540, the controller 200 may determine that the second threshold value may be applied. At step S560, the controller 200 may control the nonvolatile memory device 100 to perform GC by applying the changed second threshold value.

When it is determined that a threshold value should not be reduced (S530, No), at step S550, the controller 200 may determine that the first threshold value may be retained. At step S560, the controller 200 may control the nonvolatile memory device 100 to perform GC by applying the first threshold value.

As such, after performing step S540, or after performing step S550, step S560 may be performed. At step S560, GC may be performed. Specifically, based on the GC threshold value set by the controller 200, the nonvolatile memory device 100 may perform GC on data storage regions having a read count exceeding the set threshold value.

Figure 6:
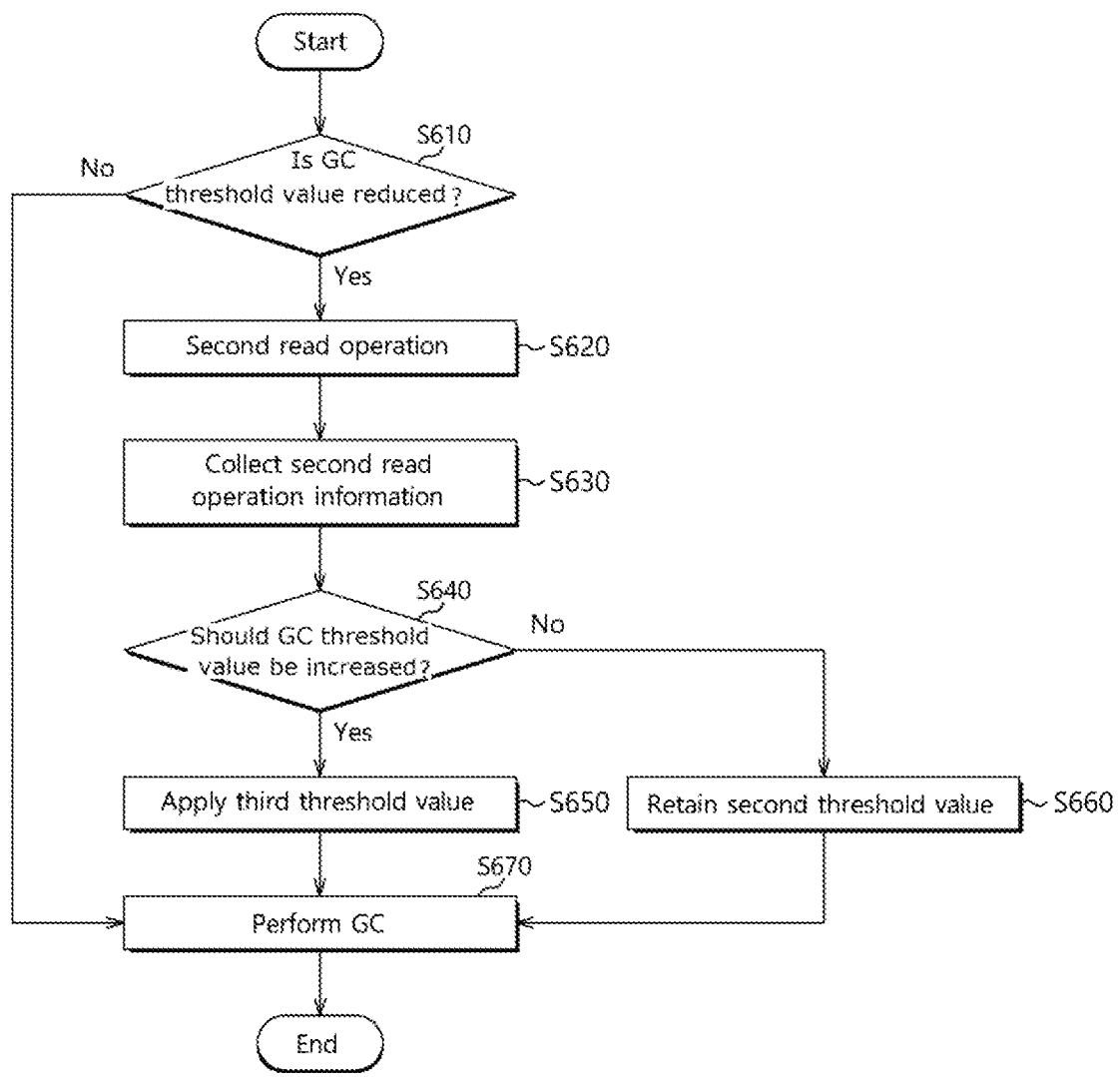
FIG. 6 is a flowchart illustrating an operating method of a data storage device in accordance with an embodiment.

FIG. 6 is a flowchart illustrating an operating method of a data storage device in accordance with an embodiment, for example, the data storage device 10 of FIG. 1.

Referring to FIG. 6, at step S610, the controller 200 may determine whether a threshold value is reduced (or decreased). Specifically, the controller 200 may check whether the threshold value for deciding whether to perform GC was changed to a smaller value, that is, whether the threshold value was changed to the second threshold value from the first threshold value.

In an embodiment, the controller 200 may check whether the second threshold value is less than a preset ratio M of the first threshold value. Specifically, the controller 200 may check whether the second threshold value is less than 80% of the first threshold value. When the GC threshold value is excessively decreased, GC may be frequently performed to degrade the performance of the data storage device 10. Thus, in order to prevent the degradation in performance of the data storage device 10, the controller 200 may perform an operation of increasing the GC threshold value again.

When it is determined that the threshold value is decreased (S610, Yes), at step S620, a second read operation may be performed. Specifically, when it is checked that the second threshold value is less than a preset ratio of the first threshold value, the controller 200 may monitor the second read operation indicating a read operation which is performed on data storage regions after the second threshold value is set, in order to vary the second threshold value to the third threshold value greater than the second threshold value.

At step S630, second read operation information may be collected. Specifically, the controller 200 may collect the second read operation information from the monitoring result of the second read operation. In various embodiments, the second read operation information may include the read counts of the data storage regions on which the second read operation was performed and information on whether soft decision has been performed on data of the data storage regions.

In an embodiment, the read counts in the second read operation information may indicate the read counts of data storage regions which have a read count greater than the second threshold value and on which soft decision is not performed, among the data storage regions on which the second read operation was performed.

At step S640, the controller 200 may determine whether a GC threshold value should be increased. Specifically, when the average value of the read counts in the second read operation information is greater than the second threshold value, it is determined that the controller 200 may vary the threshold value to the third threshold value which is the average value of the read counts in the second read operation information. When the average value of the read counts in the second read operation information is less than the second threshold value, it is determined that the controller 200 may not change the threshold value.

When it is determined that a GC threshold value should be increased (S640, Yes), at step S650, the third threshold value may be applied. Specifically, the controller 200 may control the nonvolatile memory device 100 to perform GC based on the changed third threshold value.

When it is determined that a GC threshold value should not be increased (S640, No), at step S660, the second threshold value may be retained. Furthermore, when the average value of the read counts in the second read operation information is less than the second threshold value, the controller 200 may not change the threshold value, but retain the second threshold value. The controller 200 may control the nonvolatile memory device 100 to perform GC based on the second threshold value.

When it is determined that the threshold value is not decreased (S610, No), or after performing step S650, or after performing step S660, step S670 may be performed. At step S670, GC may be performed. The nonvolatile memory device 100 may perform GC on the data storage regions based on the threshold value under control of the controller 200.

Figure 7:
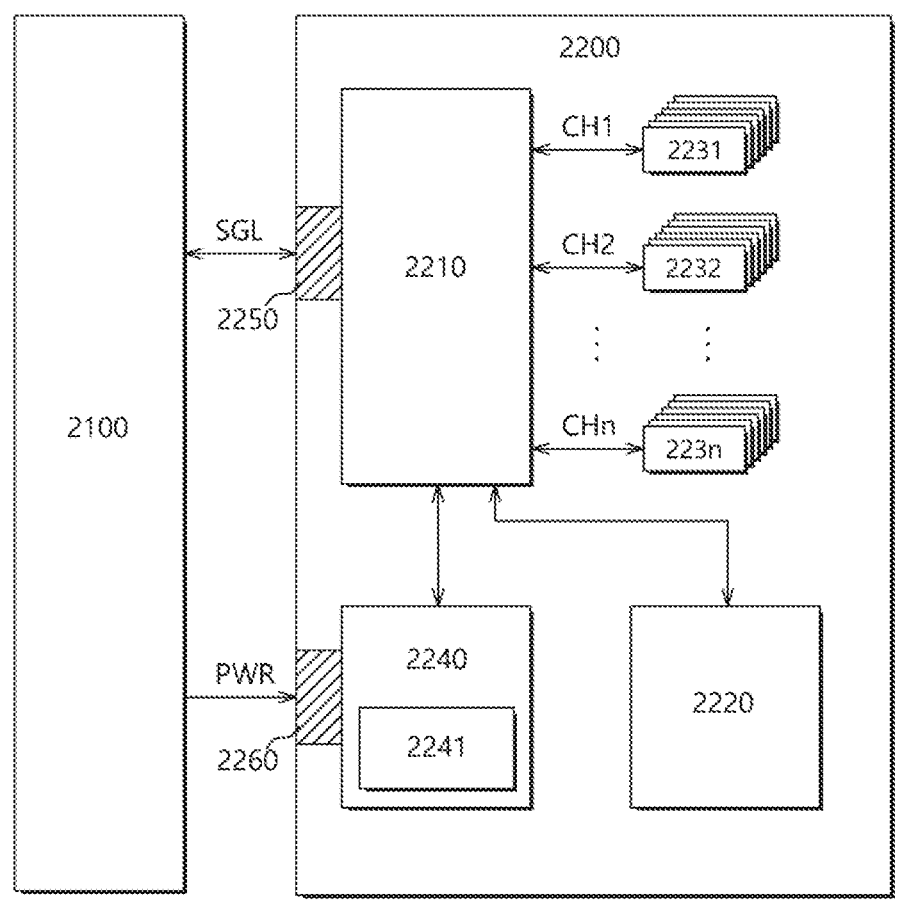
FIG. 7 is a diagram illustrating a data processing system including a solid state drive (SSD) in accordance with an embodiment.

FIG. 7 illustrates a data processing system 2000 including a solid state drive (SSD) 2200 in accordance with an embodiment. Referring to FIG. 7, the data processing system 2000 may include a host device 2100 and the SSD 2200.

The SSD 2200 may include a controller 2210, a buffer memory device 2220, nonvolatile memory devices 2231 to 223*n*, a power supply 2240, a signal connector 2250 and a power connector 2260.

The controller 2210 may control overall operations of the SSD 2200.

The buffer memory device 2220 may temporarily store data which are to be stored in the nonvolatile memory devices 2231 to 223*n*. Furthermore, the buffer memory device 2220 may temporarily store data read from the nonvolatile memory devices 2231 to 223*n*. The data which are temporarily stored in the buffer memory device 2220 may be transferred to the host device 2100 or the nonvolatile memory devices 2231 to 223*n* under control of the controller 2210.

The nonvolatile memory devices 2231 to 223*n* may be used as storage media of the SSD 2200. The nonvolatile memory devices 2231 to 223*n* may be coupled to the controller 2210 through a plurality of channels CH1 to CH*n*. One or more nonvolatile memory devices may be coupled to one channel. The nonvolatile memory devices coupled to one channel may be coupled to the same signal bus and data bus.

The power supply 2240 may provide power PWR inputted through the power connector 2260 into the SSD 2200. The power supply 2240 may include an auxiliary power supply 2241. The auxiliary power supply 2241 may supply power to normally turn off the SSD 2200, when a sudden power off occurs. The auxiliary power supply 2241 may include large capacitors capable of storing power PWR.

The controller 2210 may exchange signals SGL with the host device 2100 through the signal connector 2250. The signal SGL may include a command, address, data and the like. The signal connector 2250 may be configured as various types of connectors depending on an interface method between the host device 2100 and the SSD 2200.

Figure 8:
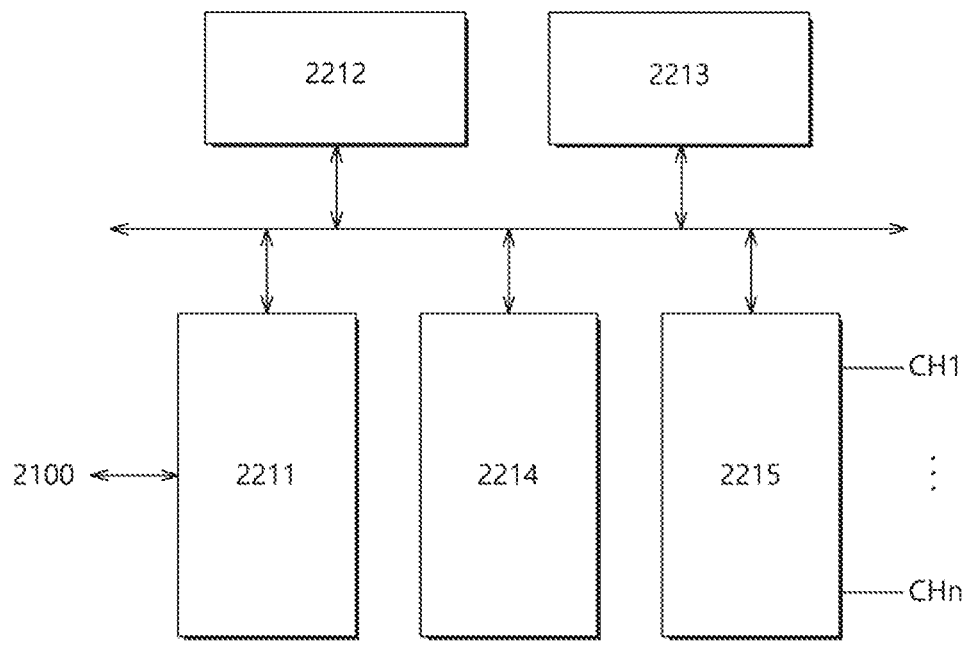
FIG. 8 is a diagram illustrating a controller of FIG. 7.

FIG. 8 illustrates the controller 2210 of FIG. 7. Referring to FIG. 8, the controller 2210 may include a host interface 2211, a controller 2212, a random access memory (RAM) 2213, an error correction code (ECC) circuit 2214 and a memory interface 2215.

The host interface 2211 may interface the host device 2100 and the SSD 2200 according to a protocol of the host device 2100. For example, the host interface 2211 may communicate with the host device 2100 through any one protocol of secure digital, Universal Serial Bus (USB), Multi-Media Card (MMC), Embedded MMC (eMMC), Personal Computer Memory Card International Association (PCMCIA), Parallel Advanced Technology Attachment (PATA), Serial Advanced Technology Attachment (SATA), Small Computer System Interface (SCSI), Serial Attached SCSI (SAS), Peripheral Component Interconnection (PCI), PCI Express (PCIe) and Universal Flash Storage (UFS). The host interface 2211 may perform a disk emulation function which supports the host device 2100 to recognize the SSD 2200 as a universal data storage device, for example, a hard disk drive (HDD).

The controller 2212 may analyze and process the signal SGL inputted from the host device 2100. The controller 2212 may control operations of internal function blocks according to firmware or software for driving the SSD 2200. The RAM 2213 may be used as a working memory for driving such firmware or software.

The ECC circuit 2214 may generate parity data of the data which are to be transferred to the nonvolatile memory devices 2231 to 223n. The generated parity data and the data may be stored in the nonvolatile memory devices 2231 to 223n. The ECC circuit 2214 may detect an error of data read from the nonvolatile memory devices 2231 to 223n based on the parity data. When the detected error falls within a correctable range, the ECC circuit 2214 may correct the detected error.

The memory interface 2215 may provide a control signal such as a command and address to the nonvolatile memory devices 2231 to 223n, under control of the controller 2212. The memory interface 2215 may exchange data with the nonvolatile memory devices 2231 to 223n, under control of the controller 2212. For example, the memory interface 2215 may provide data stored in the buffer memory device 2220 to the nonvolatile memory devices 2231 to 223n, or provide data read from the nonvolatile memory devices 2231 to 223n to the buffer memory device 2220.

Figure 9:
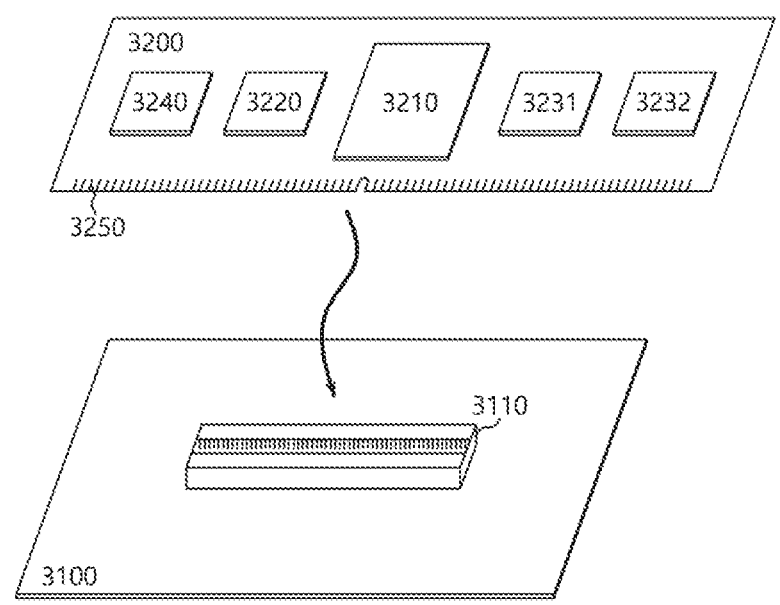
FIG. 9 is a diagram illustrating a data processing system including a data storage device in accordance with an embodiment.

FIG. 9 illustrates a data processing system 3000 including a data storage device 3200 in accordance with an embodiment. Referring to FIG. 9, the data processing system 3000 may include a host device 3100 and the data storage device 3200.

The host device 3100 may be configured as a board such as a PCB. Although not illustrated, the host device 3100 may include internal function blocks for performing a function of the host device.

The host device 3100 may include a connection terminal 3110 such as a socket, slot or connector. The data storage device 3200 may be mounted on the connection terminal 3110.

The data storage device 3200 may be configured as a board such as a PCB. The data storage device 3200 may be referred to as a memory module or memory card. The data storage device 3200 may include a controller 3210, a buffer memory device 3220, nonvolatile memory devices 3231 and 3232, a power management integrated circuit (PMIC) 3240 and a connection terminal 3250.

The controller 3210 may control overall operations of the data storage device 3200. The controller 3210 may be configured in the same manner as the controller 2210 illustrated in FIG. 11.

The buffer memory device 3220 may temporarily store data which are to be stored in the nonvolatile memory devices 3231 and 3232. Furthermore, the buffer memory device 3220 may temporarily store data read from the nonvolatile memory devices 3231 and 3232. The data which are temporarily stored in the buffer memory device 3220 may be transferred to the host device 3100 or the nonvolatile memory devices 3231 and 3232 under control of the controller 3210.

The nonvolatile memory devices 3231 to 3232 may be used as storage media of the data storage device 3200.

The PMIC 3240 may provide power inputted through the connection terminal 3250 into the data storage device 3200. The PMIC 3240 may manage the power of the data storage device 3200 under control of the controller 3210.

The connection terminal 3250 may be coupled to the connection terminal 3110 of the host device 3100. Through the connection terminal 3250, signals and power may be transferred between the host device 3100 and the data storage device 3200, the signals including a command, address, data and the like. The connection terminal 3250 may be configured in various manners depending on an interface method between the host device 3100 and the data storage device 3200. The connection terminal 3250 may be disposed at any one side of the data storage device 3200.

Figure 10:
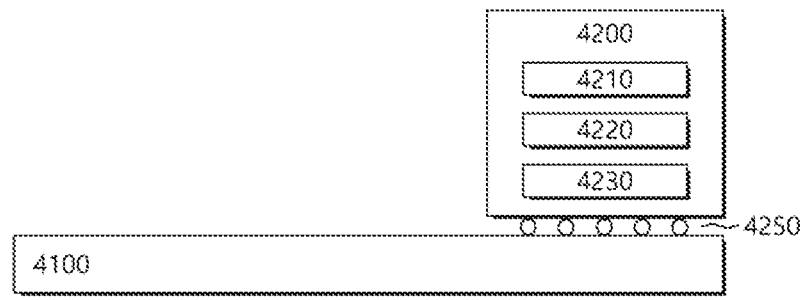
FIG. 10 is a diagram illustrating a data processing system including a data storage device in accordance with an embodiment.

FIG. 10 illustrates a data processing system 4000 including a data storage device 4200 in accordance with an embodiment. Referring to FIG. 10, the data processing system 4000 may include a host device 4100 and the data storage device 4200.

The host device 4100 may be configured as a board such as a PCB. Although not illustrated, the host device 4100 may include internal function blocks for performing a function of the host device.

The data storage device 4200 may be configured as a surface mount package. The data storage device 4200 may be mounted on the host device 4100 through solder balls 4250. The data storage device 4200 may include a controller 4210, a buffer memory device 4220 and a nonvolatile memory device 4230.

The controller 4210 may control overall operations of the data storage device 4200. The controller 4210 may be configured in the same manner as the controller 2210 illustrated in FIG. 11.

The buffer memory device 4220 may temporarily store data which are to be stored in the nonvolatile memory device 4230. Furthermore, the buffer memory device 4220 may temporarily store data read from the nonvolatile memory device 4230. The data which are temporarily stored in the buffer memory device 4220 may be transferred to the host device 4100 or the nonvolatile memory device 4230 under control of the controller 4210.

The nonvolatile memory device 4230 may be used as a storage medium of the data storage device 4200.

Figure 11:
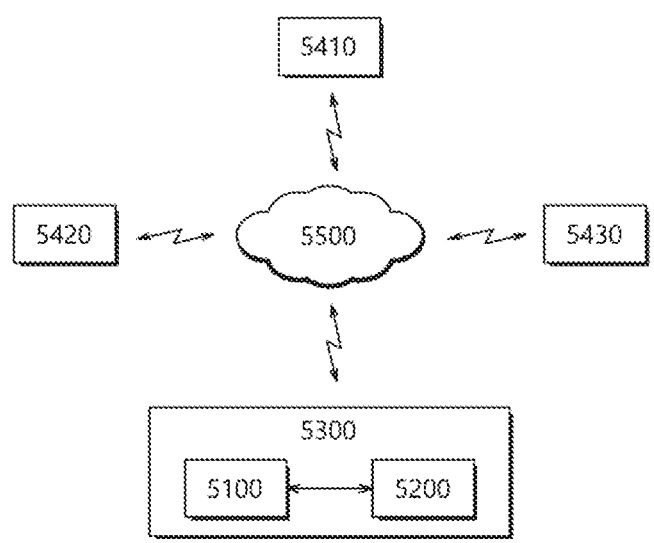
FIG. 11 is a diagram illustrating a network system including a data storage device in accordance with an embodiment.

FIG. 11 illustrates a network system 5000 including a data storage device in accordance with an embodiment of the present invention. Referring to FIG. 11, the network system 5000 may include a server system 5300 and a plurality of client systems 5410, 5420 and 5430 which are connected through a network 5500.

The server system 5300 may provide data in response to requests of the plurality of client systems 5410, 5420 and 5430. For example, the server system 5300 may store data provided from the plurality of client systems 5410, 5420 and 5430. For another example, the server system 5300 may provide data to the plurality of client systems 5410, 5420 and 5430.

The server system 5300 may include a host device 5100 and a data storage device 5200. The data storage device 5200 may be configured as the data storage device 10 of FIG. 1, the data storage device 2200 of FIG. 7, the data storage device 3200 of FIG. 9 or the data storage device 4200 of FIG. 10.

FIG. 12 is a block diagram illustrating a nonvolatile memory device 100 in a data storage device in accordance with an embodiment. Referring to FIG. 15, the nonvolatile memory device 100 may include a memory cell array 110, a row decoder 120, a column decoder 130, a data read and write (read/write) block 140, a voltage generator 150 and a control logic 160.

The memory cell array 110 may include memory cells MC arranged at the respective intersections between word lines WL1 to WLm and bit lines BL1 to BLn.

The row decoder 120 may be coupled to the memory cell array 110 through the word lines WL1 to WLm. The row decoder 120 may operate under control of the control logic 160. The row decoder 120 may decode an address provided from an external device (not illustrated). The row decoder 120 may select and drive the word lines WL1 to WLm based on the decoding result. For example, the row decoder 120 may provide word line voltages provided from the voltage generator 150 to the word lines WL1 to WLm.

The data read/write block 140 may be coupled to the memory cell array 110 through the bit line BL1 to BLn. The data read/write block 140 may include read/write circuits RW1 to RWn corresponding to the respective bit line BL1 to BLn. The data read/write block 140 may operate under control of the control logic 160. The data read/write block 140 may operate as a write driver or sense amplifier depending on operation modes. For example, the data read/write block 140 may operate as a write driver which stores data provided from the external device in the memory cell array 110, during a write operation. For another example, the data read/write block 140 may operate as a sense amplifier which reads data from the memory cell array 110, during a read operation.

The column decoder 130 may operate under control of the control logic 160. The column decoder 130 may decode an address provided from the external device. The column decoder 130 may couple the read/write circuits RW1 to RWn of the data read/write block 140, corresponding to the respective bit lines BL1 to BLn, to a data input/output line (or data input/output buffer) according to the decoding result.

The voltage generator 150 may generate a voltage which is used for an internal operation of the nonvolatile memory device 100. The voltages generated by the voltage generator 150 may be applied to the memory cells of the memory cell array 110. For example, a program voltage generated during a program operation may be applied to a word line of memory cells on which the program operation is to be performed. For another example, an erase voltage generated during an erase operation may be applied to well regions of memory cells on which the erase operation is to be performed. For another example, a read voltage generated during a read operation may be applied to a word line of memory cells on which the read operation is to be performed.

The control logic 160 may control overall operations of the nonvolatile memory device 100 based on a control signal provided from the external device. For example, the control logic 160 may control an operation of the nonvolatile memory device 100, such as a read, write or erase operation of the nonvolatile memory device 100.

The control logic may control the memory device to perform a program operation. For this operation, the control logic may include firmware such as the FLT illustrated in FIG. 2. Furthermore, it is obvious that the control logic may perform the method illustrated in FIGS. 5 and 6 through the firmware.

In accordance with the present embodiments, it is possible to efficiently operate GC of the data storage device.

While various embodiments have been described above, it will be understood to those skilled in the art that the embodiments described are examples only. Accordingly, the data storage device and the operating method which are described herein should not be limited based on the described embodiments.

What is claimed is:

1. A data storage device comprising:
a nonvolatile memory device including a plurality of data storage regions; and
a controller including a flash translation layer for controlling an operation of the nonvolatile memory device,
wherein the flash translation layer monitors a first read operation on the plurality of data storage regions, collects first read operation information of a first subset of data storage regions on which the first read operation is performed, among the plurality of data storage regions, wherein the first read operation information includes read counts and information on whether or not soft decision has been performed for each of the data storage regions including the first subset on which the first read operation is performed,
changes a garbage collection triggering condition based on the collected first read operation information, and
controls the nonvolatile memory device to perform garbage collection on the plurality of data storage regions based on the changed garbage collection triggering condition.

2. The data storage device according to claim 1, wherein the flash translation layer changes the garbage collection triggering condition froma first threshold value, which is a default garbage collection triggering condition to a second threshold value less than the first threshold value.

3. The data storage device according to claim 1, wherein the first read operation includes a read operation on the plurality of data storage regions, which is performed for a first set time.

4. The data storage device according to claim 1, wherein the first read operation includes a read operation on a first set number of data storage regions, among the plurality of data storage regions.

5. The data storage device according to claim 2, wherein the second threshold value is configured to an average value of read counts of data storage regions on which the soft decision has been performed, among the first subset of data storage regions.

6. The data storage device according to claim 2, wherein the is flash translation layer monitors a second read operation on the plurality of data storage regions,
collects second read operation information from the monitoring result of the second read operation, wherein the second read operation information includes read and information on whether or not soft decision has been performed for each of the data storage regions included in the second subset on which the second read operation is performed,
changes the changed garbage collection triggering condition to a third threshold value greater than the second threshold value based on the collected second read operation information, and controls the nonvolatile memory device to perform the garbage collection based on the third threshold value.

7. The data storage device according to claim 6, wherein the second read operation includes a read operation on the plurality of data storage regions, which is performed for a second set time.

8. The data storage device according to claim 6, wherein the second read operation includes a read operation on a second set number of data storage regions, among the plurality of data storage regions.

9. The data storage device according to claim 6, wherein the third threshold value is configured to and average value of read counts of data storage regions which have a read count greater than the second threshold value and on which the soft decision is not performed, among the second subset of data storage regions.

10. The data storage device according to claim 6, wherein the flash translation layer changes the changed garbage collection triggering condition to the third threshold value when the second threshold value is less than or equal to a preset ratio of the first threshold value.

11. An operating method of a data storage device which includes a nonvolatile memory device including a plurality of data storage regions and a controller configured to control an operation of the nonvolatile memory device, the operating method comprising:
monitoring, by the controller, a first read operation on the s plurality of data storage regions;
collecting, by the controller, first read operation information from the monitoring result of the first read operation, wherein the first read operation information includes read counts and information on whether soft or not decision has been performed for each of the data storage regions included in the first subset on which the first read operation is performed;
changing, by the controller, a garbage collection triggering condition based on the collected first read operation information; and
controlling, by the controller, the nonvolatile memory device to perform garbage collection on the plurality of data storage regions based on the changed garbage collection triggering condition.

12. The operating method according to claim 11, wherein the changing of the garbage collection triggering condition comprises changing garbage collection triggering condition from a first threshold value, which is a default garbage collection triggering condition to a second threshold value less than the first threshold value.

13. The operating method according to claim 11, wherein the first read operation includes a read operation on the plurality of data storage regions, which is performed for a first set time.

14. The operating method according to claim 11, wherein the first read operation includes a read operation on a first set number of data storage regions, among the plurality of data storage regions.

15. The operating method according to claim 11, wherein the second threshold value is configured to an average value of read counts of data storage regions on which the soft decision has been performed, among the first subset of data storage regions.

16. The operating method according to claim 12, further comprising:
monitoring, by the controller, a second read operation on the is plurality of data storage regions;
collecting, by the controller, second read operation information from the monitoring result of the second read operation, wherein the second read operation information includes read counts and information on whether or not soft decision has been performed for each of the data storage regions included in the second subset on which the second read operation is performed; and
changing, by the controller, the changed garbage collection triggering condition to a third threshold value greater than the second threshold value, based on the collected second read operation information.

17. The operating method according to claim 16, wherein the second read operation includes at least one of a read operation on the plurality of data storage regions, which is performed for a second set time and the read operation on a second set number of data storage regions, among the plurality of data storage regions.

18. The operating method according to claim 16, wherein the third threshold value is configured to an average value of read counts of data storage regions which have a read count greater than the second threshold value and on which the soft decision is not performed, among the second subset of data storage regions.

19. The operating method according to claim 16, wherein the changing of the changed garbage collection triggering condition to the third threshold value comprises changing the changed garbage collection triggering condition to the third threshold value when the second threshold value is less than or equal to a preset ratio of the first threshold value.

20. A data storage device comprising:
a memory device including a plurality of data storage regions; and
a controller suitable for:
performing a read operation on a subset of data storage regions among the plurality of data storage regions;
determining whether an average of read count values for each of the data storage regions included in the subset of data storage regions are greater than a default garbage collection triggering condition;
when the average of the read count values is less than or equal to the default garbage collection threshold value, decreasing the garbage collection triggering condition; and
performing a garbage collection operation based on the decreased garbage collection triggering condition.

* * * * *